United States Patent
Yoon et al.

(10) Patent No.: US 7,595,369 B2
(45) Date of Patent: Sep. 29, 2009

(54) METHOD OF POLYMERIZING CYCLIC OLEFINS AND VINYL OLEFINS, COPOLYMER PRODUCED BY THE METHOD AND OPTICAL ANISOTROPIC FILM COMPRISING THE SAME

(75) Inventors: Sung Cheol Yoon, Daejeon (KR); Sung Ho Chun, Daejeon (KR); Heon Kim, Yeosu (KR); Tae Sun Lim, Daejeon (KR); Jung Min Lee, Gumi (KR)

(73) Assignee: LG Chem, Ltd., Seoul (KR)

( * ) Notice: Subject to any disclaimer, the term of this patent is extended or adjusted under 35 U.S.C. 154(b) by 579 days.

(21) Appl. No.: 11/269,885

(22) Filed: Nov. 9, 2005

(65) Prior Publication Data

US 2006/0100403 A1    May 11, 2006

(30) Foreign Application Priority Data

Nov. 10, 2004  (KR) .............. 10-2004-0091568
Nov. 8, 2005   (KR) .............. 10-2005-0106397

(51) Int. Cl.
C08F 4/52   (2006.01)
C08F 4/34   (2006.01)
C08F 4/04   (2006.01)
C08F 232/08 (2006.01)

(52) U.S. Cl. .............. 526/219.2; 526/184; 526/189; 526/192; 526/195; 526/197; 526/198; 526/219; 526/219.1; 526/226; 526/238

(58) Field of Classification Search .............. 526/184, 526/185, 189, 219, 219.1, 219.2, 226, 238, 526/192, 195, 197, 198, 281, 282

See application file for complete search history.

(56) References Cited

U.S. PATENT DOCUMENTS

| 3,959,225 | A | * | 5/1976 | Kuntz ............... 526/73 |
| 4,107,418 | A | * | 8/1978 | Yatsu et al. ............ 526/184 |
| 5,585,219 | A | * | 12/1996 | Kaimoto et al. ........ 430/270.1 |
| 7,087,691 | B2 | * | 8/2006 | Rhodes et al. .......... 526/171 |

* cited by examiner

*Primary Examiner*—Fred M Teskin
(74) *Attorney, Agent, or Firm*—McKenna Long & Aldridge LLP

(57) ABSTRACT

A method of copolymerizing cyclic olefins and polar vinyl olefins, a copolymer produced by the method, and an optical anisotropic film including the copolymer are provided. According to the copolymerization method, a cyclic olefin and a polar vinyl olefin can be effectively copolymerized using a catalyst system composed of a compound containing a group 13 element and a radical initiator. The resulting copolymer is transparent, and has high adhesion, thermal stability, optical anisotropy and strength, and a low dielectric constant. The optical film including the copolymer can be used as a plastic lens, a polarizer protective film, an adhesive film, and a compensation film, and in a LCD display.

7 Claims, 4 Drawing Sheets

METHOD OF POLYMERIZING CYCLIC OLEFINS AND VINYL OLEFINS, COPOLYMER PRODUCED BY THE METHOD AND OPTICAL ANISOTROPIC FILM COMPRISING THE SAME

CROSS-REFERENCE TO RELATED PATENT APPLICATION

This application claims the benefit of Korean Patent Application Nos. 10-2004-0091568, filed on Nov. 10, 2004 and 10-2005-0106397, filed on Nov. 8, 2005, in the Korean Intellectual Property Office, the disclosure of which is incorporated herein in its entirety by reference.

BACKGROUND OF THE INVENTION

1. Field of the Invention

The present invention relates to a method of copolymerizing cyclic olefins and vinyl olefins, a copolymer produced by the method, and an optical anisotropic film comprising the same. More particularly, the present invention relates to a method of copolymerizing cyclic olefins and vinyl olefins in a high yield, a high heat resistant copolymer produced by the method, and an optical anisotropic film comprising the copolymer.

2. Description of the Related Art

Inorganic materials such as silicon oxides or nitrides have been mainly utilized in the information and electronic industries. Recent technical developments and demands for compact and high efficiency devices need new high performance materials. In this respect, a great deal of attention has been paid to polymers which have desirable physicochemical properties such as low dielectric constant and moisture absorption rate, high adhesion to metals, strength, thermal stability and transparency, and a high glass transition temperature ($T_g$>250° C.).

Examples of resins for optical components, which are generally used, include a methacrylic resin, polycarbonate, polyimide, and the like. However, these resins are not suitable for high performance optical components due to disadvantages such as low thermal stability, high birefringence, and coloration.

Recently, polyacrylate, polyethersulfone (PES), polynorbornene (PNB), and cycloolefin copolymer (COC), which have a $T_g$ of 100° C. or greater, a transmittance of 90% or more, low birefringence, and a low moisture absorption property, appeared as alternative polymers. These polymers consist of primarily a carbonyl group as a polar group and an aromatic or cyclic olefin portion as a non-polar group, and may further include fluorine (F) in order to improve physical properties such as a heat resistance, a refractive index, and a moisture absorption property.

PES is an amorphous and heat resistant engineering plastic which includes diaryl sulfone as a backbone and has a high Tg of approximately 225° C. and a strong resistance to thermal aging. PNB is made of norbornene derivatives and has a high Tg of approximately 300° C., a transparency of 92% or greater, and a low birefringence. COC (or COP) consists of a cyclic olefin and an ethylene backbone and has a Tg of 100-200° C., a high transparency, and a low birefringence, and can be subjected to extrusion and injection molding. And these have higher transparency, heat resistance, and chemical resistance and much lower birefringence and moisture absorption rate than conventional olefin polymers. Thus, this polymer can be applied to various applications, e.g., optical components such as mobile phone camera lens, CD/DVD pick-up lens, LCD light guide panel and POFs (plastic optical fibers), electronic and information components such as capacitor films and low-dielectrics, and medical components such as low-absorbent syringes, blister packagings, etc.

Meanwhile, polyacrylate has very high hardness and adhesion and high transparency, and thus is widely used in an optical field such as glass substitutes.

Thus, when norbornene is copolymerized with acrylate, a new polymer having features to be applicable to broader field can be obtained. However, a polar vinyl olefin monomer is generally polymerized through a radical or anionic initiator, whereas a norbornene monomer is addition-polymerized by a late transition metal catalyst such as Ni or Pd. Due to such a contrary polymerization characteristic of the two monomers, their direct copolymerization is difficult to carry out.

In the early days, norbornene and polar vinyl olefin were copolymerized by radical polymerization, in which the content of norbornene in the copolymer is very low ($\leqq$5.5% by weight) (Morris et al., U.S. Pat. No. 3,536,681; Starmer et al., U.S. Pat. No. 3,679,490). Thereafter, copolymerization of norborene and acrylate using a palladium catalyst was reported, but a polymerization yield is low or it is difficult to obtain reproducible polymerization results (Goodall et al., U.S. Pat. No. 6,303,724; Sen et al., U.S. Pat. No. 6,111,041 and U.S. Pat. No. 6,593,440).

Therefore, there has been a demand for a new method of producing a copolymer of norbornene and vinyl olefin with a high molecular weight and a high yield.

SUMMARY OF THE INVENTION

The present invention provides a method of copolymerizing cyclic olefins and polar vinyl olefin monomers with a high molecular weight and a high yield.

The present invention also provides a copolymer, which has a low dielectric constant, a high glass transition temperature, a high thermal and oxidative stability, toughness, a high chemical resistance and adhesion to metal, and thus can be used in electronic components.

The present invention also provides an optical film which has a high transparency and controllable refractive index, and thus can be used as a polarizer protective film, an adhesive film, and an optical anisotropic compensation film, and in a LCD display.

According to an aspect of the present invention, there is provided a method of copolymerizing cyclic olefins and polar vinyl olefins, which includes:

contacting cyclic olefin monomers and polar vinyl olefin monomers with a catalyst system including:

i) a compound represented by formula (1) containing a group 13 element; and ii) a radical initiator composed of an azo compound represented by formula (2) or a peroxide compound represented by formula (3):

  (1)

where M is a group 13 element; O is an oxygen atom; each of n1, n2, and n3 is independently an integer of 0-3 and n1+n2+n3=3; each of $R^0$ and $R^1$ is independently a hydrogen atom; a linear or branched $C_{1-20}$ alkyl, alkenyl, or vinyl; a $C_{5-12}$ cycloalkyl optionally substituted by a hydrocarbon; a $C_{6-40}$ aryl optionally substituted by a hydrocarbon; or a linear or branched $C_{1-20}$ alkyl or aryl containing 1-10 hetreo atoms such as N, O, and halogen atoms; and X is a halogen atom;

  (2)

where N is a nitrogen atom; and each of $A_1$ and $A_2$ is independently a hydrogen atom; a linear or branched $C_{1-20}$ alkyl, alkoxy, alkenyl, or vinyl; a $C_{5-12}$ cycloalkyl optionally substituted by a hydrocarbon; a $C_{6-40}$ aryl optionally substituted by a hydrocarbon; or a linear or branched $C_{1-20}$ alkyl, alkoxy, alkenyl, aryl, or cycloalkylhetero containing a cyano group, a carbonyl group, a carboxylic group, an ether group, or an amide group;

$$B_1\text{—O—O—}B_2 \tag{3}$$

where O is an oxygen atom; and each of $B_1$ and $B_2$ is independently a hydrogen atom; a linear or branched $C_{1-20}$ alkyl, alkoxy, alkenyl, or vinyl; a $C_{5-12}$ cycloalkyl optionally substituted by a hydrocarbon; a $C_{6-40}$ aryl optionally substituted by a hydrocarbon; or a linear or branched $C_{1-20}$ alkyl, alkoxy, alkenyl, aryl, or cycloalkylhetero containing a cyano group, a carbonyl group, a carboxylic group, an ether group, or an amide group.

According to another aspect of the present invention, there is provided a copolymer having good physical properties, produced by the above method.

According to another aspect of the present invention, there is provided a polarizing protective film, an adhesive film, an optical anisotropic film, an optical compensation film, and a LCD display module.

When the copolymerization method according to an embodiment of the present invention is used, cyclic olefins and polar vinyl olefins can be copolymerized with a high yield using a catalyst system composed of a compound containing a group 13 element and a radical initiator. The copolymer produced by the method has good physical properties, including high transparency, adhesion to metals or other polymers, thermal stability and strength, and a low dielectric constant. Thus, the optical film including the copolymer can be used as a polarizer protective film, an adhesive film, and an anisotropic compensation film, and in a LCD display module.

The inventors of the invention found that when cyclic olefin monomers and polar vinyl olefin monomers are contacted with a catalyst system composed of a compound containing a group 13 element and an azo compound (or peroxide compound), a copolymer having high transparency and optical anisotropy is obtained in a high yield.

BRIEF DESCRIPTION OF THE DRAWING

The above and other features and advantages of the present invention will become more apparent by describing in detail exemplary embodiments thereof with reference to the attached drawings in which.

DETAILED DESCRIPTION OF THE INVENTION

Figure 1:
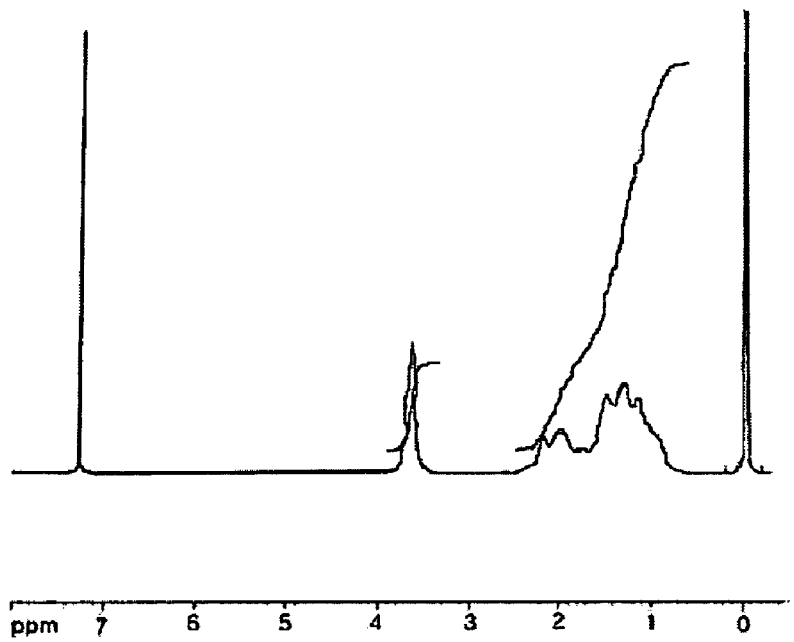
FIG. 1 is a $^1$H NMR spectrum of a norbornene-methyl acrylate copolymer.
Figure 2:
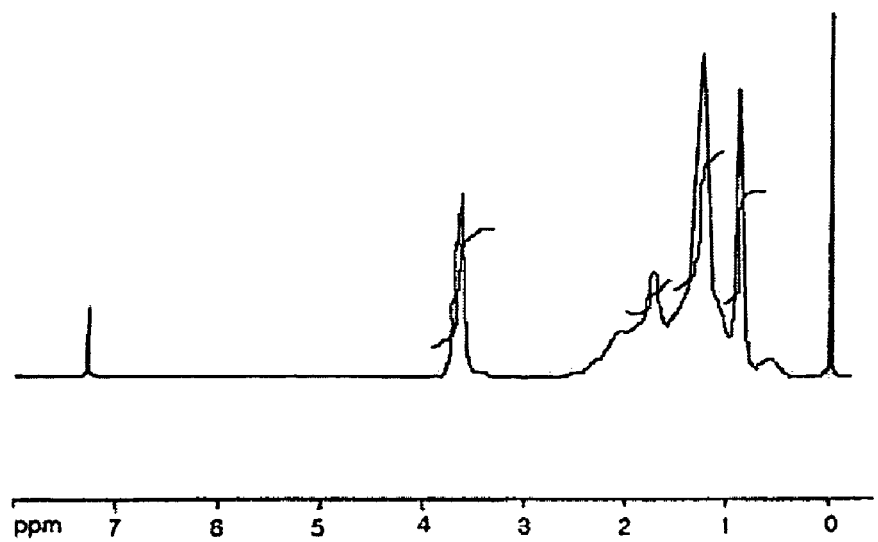
FIG. 2 is a $^1$H NMR spectrum of a butyl norbornene-methyl acrylate copolymer.
Figure 3:
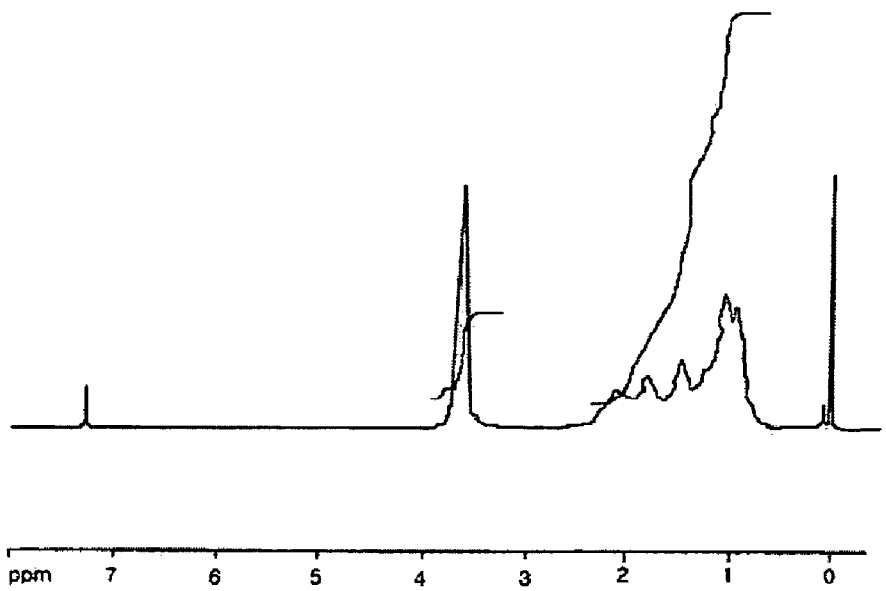
FIG. 3 is a $^1$H NMR spectrum of a norbornene-methyl methacrylate copolymer.
Figure 4:
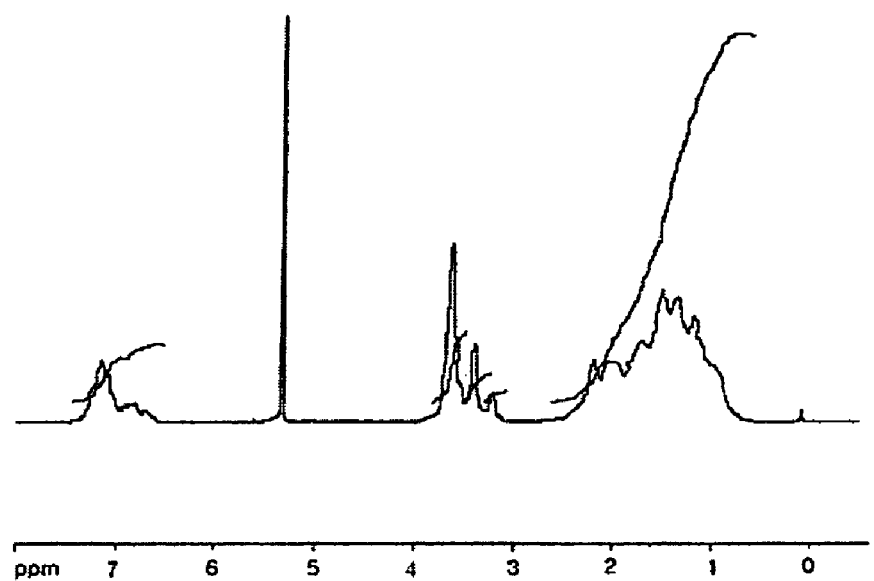
FIG. 4 is a $^1$H NMR spectrum of a norbornene-methyl acrylate-styrene terpolymer.
Figure 5:
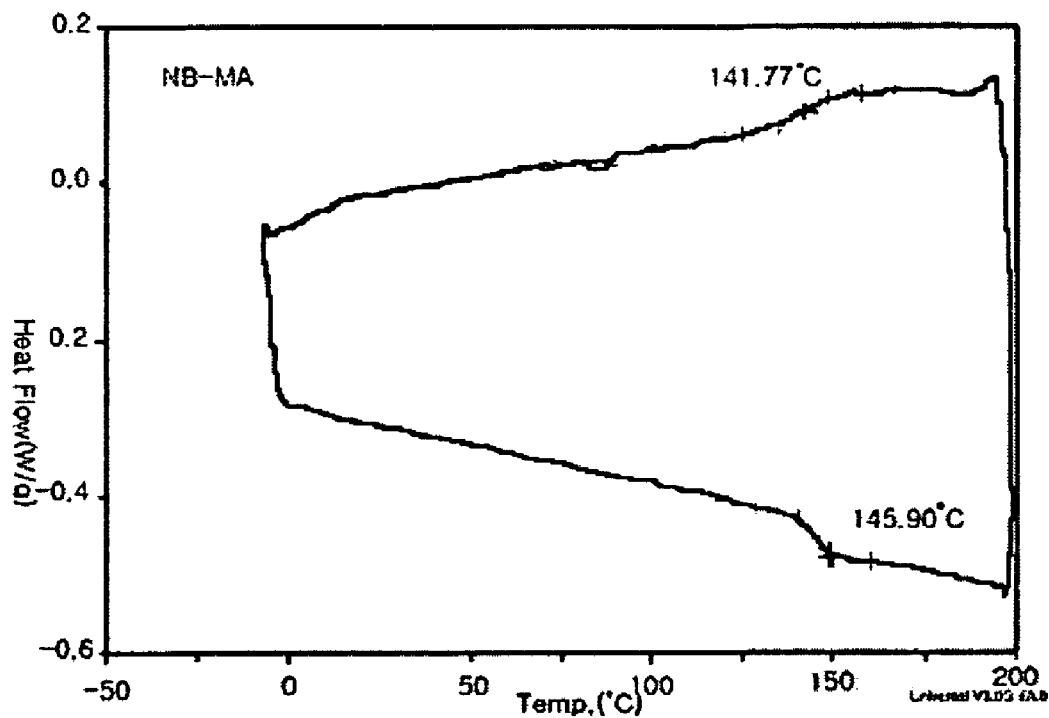
FIG. 5 is a DSC (differential scanning calorimetry) thermodiagram of a norbornene-methyl acrylate copolymer.
Figure 6:
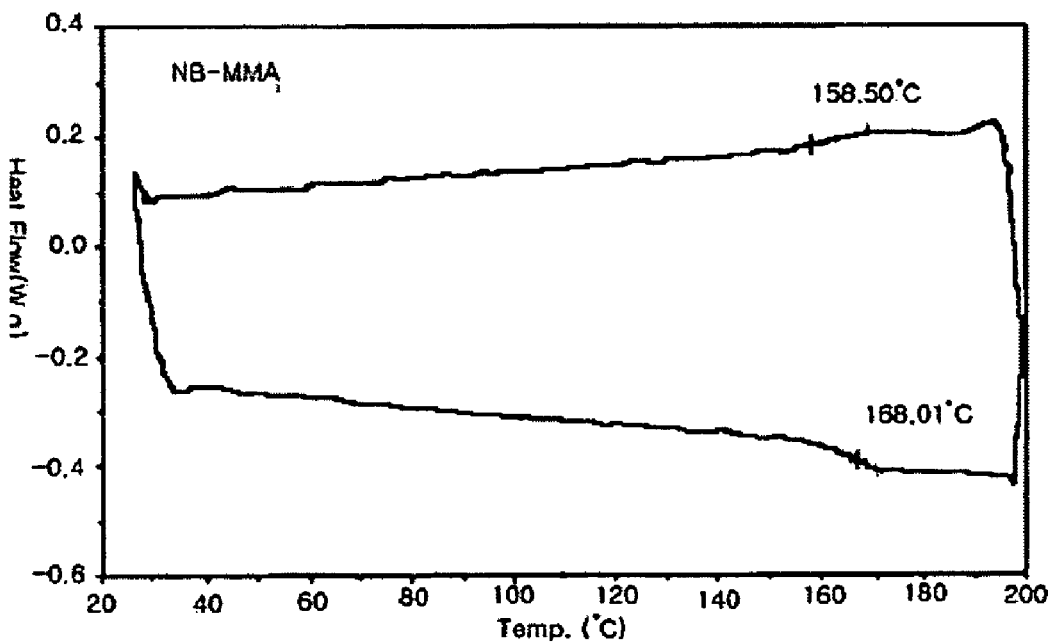
FIG. 6 is a DSC thermodiagram of a norbornene-methyl methacrylate copolymer.
Figure 7:
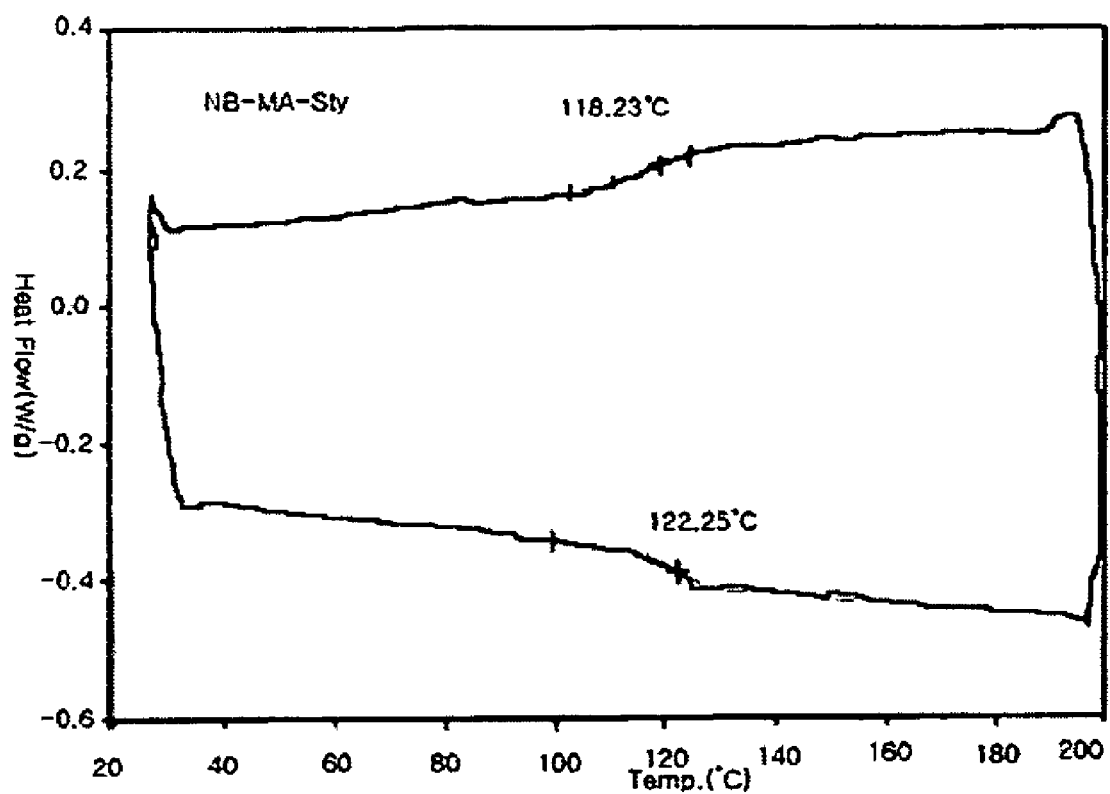
FIG. 7 is a DSC thermodiagram of a norbornene-methyl acrylate-styrene terpolymer.

In the present invention, a cyclic olefin monomer, a polar vinyl olefin monomer, and a catalyst are dissolved in a solvent and mixed to polymerize as in a conventional polymerization method. A catalyst system to be contacted with the monomers includes a compound represented by formula (1), containing a group 13 element and a radical initiator composed of an azo compound represented by formula (2) (or a peroxide compound represented by formula (3)).

The cyclic olefin monomer is represented by formula (4):

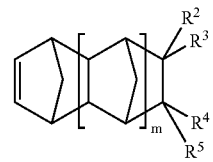

(4)

where m is an integer of 0-4; $R^2$, $R^3$, $R^4$, and $R^5$ may be a nonpolar functional group selected from a hydrogen atom, a halogen atom, a linear or branched $C_{1-20}$ alkyl, alkenyl, or vinyl, a $C_{5-12}$ cycloalkyl optionally substituted by a hydrocarbon, a $C_{6-40}$ aryl optionally substituted by a hydrocarbon, a $C_{7-15}$ aralkyl optionally substituted by a hydrocarbon, or a $C_{3-20}$ alkynyl; or a polar functional group selected from the group consisting of —$(CH_2)_nC(O)OR^6$, —$(CH_2)_nOC(O)R^6$, —$(CH_2)_nOC(O)OR^6$, —$(CH_2)_nC(O)R^6$, —$(CH_2)_nOR^6$, —$(CH_2O)_n$—$OR^6$, —$(CH_2)_nC(O)$—O—$C(O)R^6$, —$(CH_2)_n C(O)NH_2$, —$(CH_2)_nC(O)NHR^6$, —$(CH_2)_nC(O)N(R^6)_2$, —$(CH_2)_nNH_2$, —$(CH_2)_nNHR^6$, —$(CH_2)_nN(R^6)_2$, —$(CH_2)_n OC(O)NH_2$, —$(CH_2)_nOC(O)NHR^6$, —$(CH_2)_nOC(O)N(R^6)_2$, —$(CH_2)_nC(O)Cl$, —$(CH_2)_nSR^6$, —$(CH_2)_nSSR^6$, —$(CH_2)_nSO_2R^6$, —$(CH_2)_nSO_2R^6$, —$(CH_2)_nOSO_2R^6$, —$(CH_2)_nSO_3R^6$, —$(CH_2)_nOSO_3R^6$, —$(CH_2)_nB(R^6)_2$, —$(CH_2)_nB(OR^6)_2$, —$(CH_2)_nB(R^6)(OR^6)$, —$(CH_2)_n N=C=S$, —$(CH_2)_nNCO$, —$(CH_2)_nN(R^6)C(=O)R^6$, —$(CH_2)_nN(R^6)C(=O)(OR^6)$, —$(CH_2)_nCN$, —$(CH_2)_nNO_2$, —$(CH_2)_nP(R^6)_2$, —$(CH_2)_nP(OR^6)_2$, —$(CH_2)_nP(R^6)(OR^6)$, —$(CH_2)_nP(=O)(R^6)_2$, —$(CH_2)_nP(=O)(OR^6)_2$, and —$(CH_2)_nP(=O)(R^6)(OR^6)$;

$R^6$ is a hydrogen atom, a linear or branched $C_{1-20}$ alkyl, alkenyl, or vinyl, a $C_{5-12}$ cycloalkyl optionally substituted by a hydrocarbon, a $C_{6-40}$ aryl optionally substituted by a hydrocarbon, a $C_{7-15}$ aralkyl optionally substituted by a hydrocarbon, or a $C_{3-20}$ alkynyl; and, n is an integer of 0-10; when $R^2$, $R^3$, $R^4$, and $R^5$ are may be a polar functional group, a hydrogen atom, or a halogen atom, $R^2$ and $R^3$, or $R^4$ and $R^5$ can be connected to each other to form a $C_{1-10}$ alkylidene group, or $R^2$ or $R^3$ can be connected to one of $R^4$ and $R^5$ to a saturated or unsaturated $C_{4-12}$ cyclic group or an $C_{6-17}$ aromatic ring compound.

The polar vinyl olefin monomer is represented by formula (5):

(5)

where at least one of $R^7$ and $R^8$ is a polar functional group selected from the group consisting of —$(CH_2)_nC(O)OR^9$, —$(CH_2)_nOC(O)R^9$, —$(CH_2)_nOC(O)OR^9$, —$(CH_2)_nC(O)R^9$, —$(CH_2)_nOR^9$, —$(CH_2O)_n$—$OR^9$, —$(CH_2)_nC(O)$—O—$C(O)R^9$, —$(CH_2)_nC(O)NH_2$, —$(CH_2)_nC(O)NHR^9$, —$(CH_2)_nC(O)N(R^9)_2$, —$(CH_2)_nNH_2$, —$(CH_2)_nNHR^9$, —$(CH_2)_nN(R^9)_2$, —$(CH_2)_nOC(O)NH_2$, —$(CH_2)_nOC(O)NHR^9$, —$(CH_2)_nOC(O)N(R^9)_2$, —$(CH_2)_nC(O)Cl$, —$(CH_2)_nSR^9$, —$(CH_2)_nSSR^9$, —$(CH_2)_nSO_2R^9$, —$(CH_2)_nSO_2R^9$, —$(CH_2)_nOSO_2R^9$, —$(CH_2)_nSO_3R^9$, —$(CH_2)_nOSO_3R^9$, —$(CH_2)_nB(R^9)_2$, —$(CH_2)_nB(OR^9)_2$, —$(CH_2)_nB(R^9)(OR^9)$, —$(CH_2)_nN=C=S$, —$(CH_2)_nNCO$, —$(CH_2)_nN(R^9)C(=O)R^9$, —$(CH_2)_nN(R^9)C(=O)(OR^9)$, —$(CH_2)_nCN$, —$(CH_2)_nNO_2$, —$(CH_2)_nP(R^9)_2$, —$(CH_2)_nP(OR^9)_2$, —$(CH_2)_nP(R^9)(OR^9)$, —$(CH_2)_nP(=O)(R^9)_2$, —$(CH_2)_nP(=O)(OR^9)_2$, and —$(CH_2)_nP(=O)(R^9)(OR^9)$;

the remaining substituent is a hydrogen atom, a halogen atom, a linear or branched $C_{1-20}$ alkyl, alkenyl, or vinyl, a $C_{5-12}$ cycloalkyl optionally substituted by a hydrocarbon, a $C_{6-40}$ aryl optionally substituted by a hydrocarbon, a $C_{7-15}$ aralkyl optionally substituted by a hydrocarbon, or a $C_{3-20}$ alkynyl; n is an integer of 0-10; and $R^9$ is a hydrogen atom, a linear or branched $C_{1-20}$ alkyl, alkenyl, or vinyl, a $C_{5-12}$ cycloalkyl optionally substituted by a hydrocarbon, a $C_{6-40}$ aryl optionally substituted by a hydrocarbon, a $C_{7-15}$ aralkyl optionally substituted by a hydrocarbon, or a $C_{3-20}$ alkynyl.

Meanwhile, the cyclic olefin monomer may be a non-polar cyclic olefin monomer or a mixture of a polar cyclic olefin monomer and a cyclic olefin monomer.

The solvent used in the polymerization method may be an organic solvent such as dichloromethane ($CH_2Cl_2$), dichloroethane ($CH_2ClCH_2Cl$), chloroform, benzene, toluene, or chlorobenzene ($C_6H_5Cl$). An amount of the solvent used is preferably 0.5-10 folds, more preferably 1-8 folds, most preferably 2-4 folds, relative to the volume of a monomer to be addition polymerized. When the amount of the solvent is lower than 0.5 folds, gel is formed and post-treatment become an indispensable. When the amount of the solvent is higher than 10 folds, the polymerization yield is low. Without such a solvent, bulk polymerization may be carried out. In this case, the reaction solution is gellated or hardened during the polymerization, which can bring about an after-treatment problem.

A polymerization temperature may be in the range of 20-150° C., and may be varied to change the polymerization conditions during the reaction. When the polymerization temperature is lower than 20° C., the catalyst is not activated and the polymerization yield is low. When the polymerization temperature is higher than 150° C., the catalyst may be decomposed due to thermal instability.

In the polymerization method, the cyclic olefin monomer and the polar vinyl olefin monomer are not limited to only two monomers and may include a combination of two cyclic olefin monomers, which have different functional groups, and a polar vinyl olefin monomer, or a combination of two polar vinyl olefin monomers, which have different functional groups, and a cyclic olefin monomer.

The copolymer may further include a non-polar vinyl olefin monomer in addition to the cyclic olefin monomer and a polar vinyl monomer. The non-polar vinyl olefin monomer may be represented by formula (6):

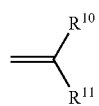

(6)

where m is an integer of 0-4; and each of $R^{10}$ and $R^{11}$ is a hydrogen atom, a halogen atom; a linear or branched $C_{1-20}$ alkyl, alkenyl, or vinyl; a $C_{5-12}$ cycloalkyl optionally substituted by a hydrocarbon; a $C_{6-40}$ aryl optionally substituted by a hydrocarbon; a $C_{7-15}$ aralkyl optionally substituted by a hydrocarbon; or a $C_{3-20}$ alkynyl.

In the polymerization method, it is preferable that the compound represented by formula (1) containing a group 13 element is the compound represented by formula (7), and the radical initiator is the azo compund represented by formula (2):

$$Al(R^0)_{n1}(OR^1)_{n2}(X)_{n3} \quad (7)$$

where Al is an aluminium atom; O is an oxygen atom; each of n1, n2, and n3 is independently an integer of 0-3 and n1+n2+n3=3; each of $R^0$ and $R^1$ is independently a hydrogen atom; a linear or branched $C_{1-20}$ alkyl, alkenyl, or vinyl; a $C_{5-12}$ cycloalkyl optionally substituted by a hydrocarbon; a $C_{6-40}$ aryl optionally substituted by a hydrocarbon; or a linear or branched $C_{1-20}$ alkyl or aryl containing 1-10 hetreo atoms such as N, O, and halogen atoms; and X is a halogen atom;

$$A_1-N=N-A_2 \quad (2)$$

where N is a nitrogen atom; and each of $A_1$ and $A_2$ is independently a hydrogen atom; a linear or branched $C_{1-20}$ alkyl, alkoxy, alkenyl, or vinyl; a $C_{5-12}$ cycloalkyl optionally substituted by a hydrocarbon; a $C_{6-40}$ aryl optionally substituted by a hydrocarbon; or a linear or branched $C_{1-20}$ alkyl, alkoxy, alkenyl, aryl, or cycloalkylhetero containing a cyano group, a carbonyl group, a carboxylic group, an ether group, or an amide group;

The copolymer produced by the method according to an embodiment of the present invention may include 0.1-99.9 mol % of a polar vinyl olefin monomer and have a weight average molecular weight (Mw) of 10,000 or greater. When the Mw of the copolymer is less than 10,000, it is difficult to produce a film. The copolymer may have a glass transition temperature (Tg) of 100° C. or greater. When the Tg of the copolymer is lower than 100° C., the thermal stability of film becomes poor.

The copolymer may be a copolymer blend which further includes at least one of a cyclic olefin monomer, a polar vinyl olefin monomer, a non-polar vinyl olefin monomer, or a copolymer of a cyclic olefin monomer and a polar vinyl olefin.

The copolymer produced in accordance with the method of the present invention is transparent, has sufficient adhesion to metals or polymers containing different polar functional groups, thermal stability and strength, and exhibits a low dielectric constant sufficient to be used as insulating electronic materials. The copolymer has a desirable adhesion to substrates of electronic components without requiring a coupling agent, and at the same time, a sufficient adhesion to metal substrates, e.g., Cu, Ag and Au. Further, the copolymer exhibits a desirable optical properties so that it can be used in electronic components such integrated circuits (ICs), printed circuit boards, multichip modules, and the like.

Thus, the copolymer prepared by the present invention has high transparency, molecular weight in the range of 10,000~1,000,000 and the glass transition temperature in the range of 100~200° C. which lead to afford to good moldability for a plastic lens. The plastic lens can be formed by various molding methods such as injection molding, compression molding, extrusion molding or injection compression molding. In the injection compression molding, generally, the cylinder temperature is 150 to 300° C. and the mold temperature is 50 to 150° C.

In addition, an optical film according to an embodiment of the present invention can be used as a polarizer protective film due to good heat resistance and strength, and has sufficient adhesion to polyvinylalcohol (PVA) to be attached to a polyvinylalcohol polarizer. Even when corona discharge, glow discharge, flame treatment, acid treatment, alkaline treatment, UV irradiation, or coating, if necessary, is performed on the optical film, its transparency, etc. is not reduced.

The copolymer of the present embodiment can be used to produce an optical anisotropic film capable of controlling a birefringence, which could not be produced with the conventional method. A conformational unit of a general cyclic olefin has one or two stable rotation states, and thus can achieve an extended conformation such as polyimide having a rigid phenyl ring as a backbone. When a monomer having a polar functional group is introduced into a norbornene-based polymer with an extended form, the interaction between molecules increases compared to polymers having compact conformations, and thus packing of molecules has a directional order, thereby producing optical and electronic anisotropy.

The birefringence can be controlled according to the type and the amount of polar functional group in the copolymer of a cyclic olefin polymer and a polar vinyl olefin. In particular, the birefringence in a direction through the film thickness is easily controlled, and thus the polymer of the present embodiment can be used to produce an optical compensation film for various modes of liquid crystal display (LCD).

The optical anisotropic film can be prepared by solution casting or melting, or can be prepared with a blend of one or more copolymers of cyclic olefins and polar vinyl olefins.

In order to prepare a film by solution casting, it is preferable to introduce a copolymer of a cyclic olefin and a polar vinyl olefin in a solvent in amount of 5-95% by weight, and preferably 10-60% by weight, and stirring the mixture at room temperature. The viscosity of the prepared solution is preferably 100-10,000 cps, and more preferably 300-8000 cps for solution casting. To improve mechanical strength, heat resistance, light resistance, and manipulability of the film, additives such as a plasticizer, an anti-deterioration agent, a UV stabilizer or an antistatic agent can be added.

The optical anisotropic film thus prepared has a retardation value ($R_{th}$) of 70 to 1000 nm, as defined by the following Equation 1:

$$R_{th} = \Delta(n_y - n_z) \times d \qquad (1)$$

where $n_y$ is a refractive index of an in-plane fast axis measured at 550 nm, $n_z$ is a refractive index toward thickness direction measured at 550 nm, and d is a film thickness.

The optical anisotropic film has clear picture quality at a wide viewing angle and can improve contrast when a driving cell is on or off, and thus can be used as an optical compensation film for LCD.

In particular, the optical anisotropic film has an optical axis perpendicular to a plate and meets a refractive index requirement of $n_x \cong n_y > n_z$, in which $n_x$ is a refractive index of an in-plane slow axis, $n_y$ is a refractive index of an in-plane fast axis, and $n_z$ is a refractive index toward thickness direction, and thus can be used as a negative C-plate type optical compensation film. Thus, the optical anisotropic film can achieve a general liquid crystal mode of LCD which meets a refractive index requirement of $n_x \cong n_y < n_z$, in which $n_x$, $n_y$, and $n_z$ are as defined above, when a voltage is on or off.

Hereinafter, the present invention will be described in more detail with reference to the following Examples. However, these Examples are given for the purpose of illustration and are not to be construed as limiting the scope of the invention.

EXAMPLES

In the following Preparation Examples and Examples, all operations handling compounds sensitive to air or water were carried out using standard Schlenk technique or dry box technique. Nuclear magnetic resonance spectra were obtained using a Bruker 300 spectrometer. $^1$H NMR and $^{13}$C NMR were measured at 300 MHz and 75 MHz, respectively. A molecular weight and a molecular weight distribution of a polymer were determined by gel permeation chromatography (GPC) using standard polystyrene samples. Thermal analyses such as TGA (thermal gravimetric analysis) and DSC (differential scanning calorimetry) were carried out using TA Instrument (TGA 2050; heating rate 10K/min). Toluene was distilled and purified in potassium/benzophenone.

Preparation Example 1

Copolymerization of Norbornene and Methyl Acrylate

Norbornene (15.8 g, 168 mmol), methyl acrylate (10 mL, 112 mmol), and AIBN (2,2'-azobisisobutyronitrile) (0.037 g, 0.22 mmol) were charged into a 250 mL Schlenk flask and dissolved in 30 mL of toluene. Ethylaluminum sesquichloride (0.277 g, 1.12 mmol) was charged into a 100 mL flask and dissolved in 20 mL of toluene. The toluene solution of ethylaluminum sesquichloride was slowly dropped to the 250 mL Schlenk flask at −70° C. The reaction temperature was raised to 45° C. while stirring the mixture for 2 hours, and then the reaction was performed at 45° C. for 12 hours. The reaction solution turned to light green in color during the reaction. After the reaction was completed, the reaction solution was slowly dropped to 3000 cc of 5% v/v HCl—MeOH to precipitate a white polymer, which was filtered through a glass filter and dried in a vacuum oven at 70° C. for 12 hours to obtain a norbornene-methyl acrylate copolymer (11.7 g: 58.2% by weight based on the total weight of used monomers). The copolymer had a Tg of 140° C., a molecular weight (Mw) of 46,600, and Mw/Mn of 1.99.

$^1$H-NMR (300 MHz in CDCl$_3$): 3.55 (br s, 3H), 2.5~1.5 (br m, 13H)

Preparation Example 2

Copolymerization of Norbornene and Methyl Acrylate

Diethylaluminium chloride (1.36 g, 1.12 mmol) was used instead of Ethylaluminum sesquichloride used in Preparation Example 1. And, norbornene was copolymerized with methyl acrylate in the same way as the Preparation Example 1.

Polymerization yield was 12.1 g (60.2% by weight based on the total weight of used monomers). The copolymer had a molecular weight (Mw) of 68,000, and Mw/Mn of 2.12.

Preparation Example 3

Copolymerization of Norbornene and Methyl Acrylate

Diethylaluminium ethoxide (1.15 g, 1.12 mmol) was used instead of Ethylaluminum sesquichloride used in Preparation Example 1. And, norbornene was copolymerized with methyl acrylate in the same way as the Preparation Example 1.

Polymerization yield was 12.5 g (62.1% by weight based on the total weight of used monomers). The copolymer had a molecular weight (Mw) of 54,000, and Mw/Mn of 2.10.

Preparation Example 4

Copolymerization of Norbornene and Methyl Acrylate

Norbornene (15.8 g, 168 mmol), methyl acrylate (10 mL, 112 mmol), and Di-t-butylperoxide (0.32 g, 2.2 mmol) were charged into a 250 mL Schlenk flask and dissolved in 30 mL of toluene. Ethylaluminum sesquichloride (0.277 g, 1.12 mmol) was charged into a 100 mL flask and dissolved in 20 mL of toluene. The toluene solution of ethylaluminum sesquichloride was slowly dropped to the 250 mL Schlenk flask at −70° C. The reaction temperature was raised to room temperature while stirring the mixture for 2 hours, and then the reaction was performed at 80° C. for 12 hours. After the reaction was completed, the reaction solution was slowly dropped to 3000 cc of 5% v/v HCl—MeOH to precipitate a white polymer, which was filtered through a glass filter and dried in a vacuum oven at 70° C. for 12 hours to obtain a norbornene-methyl acrylate copolymer (10.5 g: 52.0% by weight based on the total weight of used monomers). The copolymer had a molecular weight (Mw) of 38,500, and Mw/Mn of 2.29.

Preparation Example 5

Copolymerization of 2-butylnorbornene and Methyl Acrylate 2-butylnorbornene (16.8 g, 112 mmol), methyl acrylate (5 mL, 56 mmol), and AIBN (0.28 g, 1.68 mmol) were charged into a 250 mL Schlenk flask and dissolved in 30 mL of toluene. Ethylaluminum sesquichloride (15.2 g; 61.6 mmol) was charged into a 100 mL flask and dissolved in 20 mL of toluene. The toluene solution of ethylaluminum sesquichloride was slowly dropped to the 250 mL Schlenk flask at −70° C. The reaction temperature was raised to room temperature while stirring the mixture for 2 hours, and then the reaction was performed at 65° C. for 12 hours. The reaction solution turned to light green in color during the reaction. After the reaction was completed, the reaction solution was slowly dropped to 3000 cc of 5% v/v HCl—MeOH to precipitate a white polymer, which was filtered through a glass filter and dried in a vacuum oven at 70° C. for 12 hours to obtain a 2-butyl norbornene-methyl acrylate copolymer (5 g: 38.0% by weight based on the total weight of used monomers). The copolymer had a Tg of 100° C., a molecular weight (Mw) of 8,180, and Mw/Mn of 3.2.

$^1$H-NMR (300 MHz in CDCl$_3$): 3.64 (br s, 3H), 2.5~0.5 (br m, 21H)

Preparation Example 6

Copolymerization of Norbornene and Methyl Methacrylate

Norbornene (8.8 g, 93 mmol), methyl methacrylate (5 mL, 47 mmol), and AIBN (0.23 g, 1.40 mmol) were charged into a 250 mL Schlenk flask and dissolved in 30 mL of toluene. Ethylaluminum sesquichloride (12.7 g, 51.4 mmol) was charged into a 100 mL flask and dissolved in 20 mL of toluene. The toluene solution of ethylaluminum sesquichloride was slowly dropped to the 250 mL Schlenk flask at −70° C. The reaction temperature was raised to room temperature while stirring the mixture for 2 hours, and then the reaction was performed at 65° C. for 12 hours. The reaction solution turned to light green in color during the reaction. After the reaction was completed, the reaction solution was slowly dropped to 3000 cc of 5% v/v HCl—MeOH to precipitate a white polymer, which was filtered through a glass filter and dried in a vacuum oven at 70° C. for 12 hours to obtain a norbornene-methyl methacrylate copolymer (0.3 g: 3.0% by weight based on the total weight of used monomers). The copolymer had a T$_g$ of 167° C., a molecular weight (Mw) of 10,700, and Mw/Mn of 3.4.

$^1$H-NMR (300 MHz in CDCl$_3$): 3.60 (br s, 3H), 2.5-0.8 (br m, 15H)

Preparation Example 7

Polymerization of Norbornene, Styrene, and Methyl Acrylate

Norbornene (10.5 g, 112 mmol), styrene (0.6 g, 5.6 mmol), methyl acrylate (5 mL, 56 mmol), and AIBN (0.028 g, 0.17 mmol) were charged into a 250 mL Schlenk flask and dissolved in 30 mL of toluene. Ethylaluminum sesquichloride (1.38 g, 5.6 mmol) was charged into a 100 mL flask and dissolved in 20 mL of toluene. The toluene solution of ethylaluminum sesquichloride was slowly dropped to the 250 mL Schlenk flask at −70° C. The reaction temperature was raised to room temperature while stirring the mixture for 2 hours, and then the reaction was performed at 65° C. for 12 hours. The reaction solution turned to light green in color during the reaction. After the reaction was completed, the reaction solution was slowly dropped to 3000 cc of 5% v/v HCl—MeOH to precipitate a white polymer, which was filtered through a glass filter and dried in a vacuum oven at 70° C. for 12 hours to obtain a norbornene-styrene-methyl acrylate terpolymer (7.1 g: 66.7% by weight based on the total weight of used monomers). The copolymer had a Tg of 120° C., a molecular weight (Mw) of 228,000, and Mw/Mn of 16.

$^1$H-NMR (300 MHz in CDCl$_3$): 7.4~6.6 (br m, 5H), 3.8~3.1 (br m, 3H), 2.4~0.6 (br m, 16H)

Example 1-4

Preparation of Optical Anisotropic Film

Each of the polymers prepared in Preparation Examples 1, 5-7 was mixed with a solvent to form a coating solution as shown in Table 1. The coating solutions were cast on a glass substrate using a knife coater or a bar coater, and then the substrate was dried at room temperature for 1 hour and further dried under a nitrogen atmosphere at 100° C. for 18 hours. The glass substrate was kept at −10° C. for 10 seconds and the film on the glass plate was peeled off with a knife to obtain a clear film having an uniform thickness. The thickness deviation of the film was less than 2%. The thickness and the light transmittance at 400-700 nm of the obtained films were shown in Table 1

TABLE 1

| | Composition of film solution | | Physical properties of film | |
|---|---|---|---|---|
| | Polymer (parts by weight) | Solvent (parts by weight) | Thickness (μm) | Light transmittance (%) |
| Example 1 | Polymer prepared in Preparation Example 1 | THF 560 | 114 | 92 |
| Example 2 | Polymer prepared in Preparation Example 5 | MC 360 and TOLUENE 200 | 120 | 92 |
| Example 3 | Polymer prepared in Preparation Example 6 | TOLUENE 550 | 118 | 90 |
| Example 4 | Polymer prepared in Preparation Example 7 | TOLUENE 400 | 103 | 91 |

In Table 1, THF is tetrahydrofurane and MC is methylene chloride.

Measurement of Optical Anisotropy

For clear films produced in Examples 1-4, a refractive index n was measured using an Abbe refractometer, an in-plane retardation value Re was measured using an automatic birefringence analyzer (available from Oji Scientific Instrument; KOBRA-21 ADH), and a retardation value $R_\theta$ was measured when the angle between incident light and the film surface was 50° and a retardation value $R_{th}$ between the direction through the film thickness and the in-plane x-axis was calculated using Equation 2:

$$R_{th} = \frac{R_\theta \times \cos\theta_f}{\sin^2\theta_f}. \tag{2}$$

A refractive index difference $(n_x - n_y)$ and a refractive index difference $(n_y - n_z)$ were calculated by dividing $R_e$ and $R_{th}$ by the film thickness. $(n_x - n_y)$, $R_\theta$, $R_{th}$ and $(n_y - n_z)$ of each clear film were indicated in Table 2.

TABLE 2

| | n (refractive index) | $(n_x - n_y) \times 10^3$ | $R_{th}$ (nm/μm) | $(n_y - n_z) \times 10^3$ |
|---|---|---|---|---|
| Example 1 | 1.52 | 0.008 | 5.78 | 5.78 |
| Example 2 | 1.50 | 0.009 | 2.13 | 2.13 |
| Example 3 | 1.52 | 0.007 | 1.47 | 1.47 |
| Example 4 | 1.51 | 0.013 | 3.59 | 3.59 |

When films were covered with a triacetate cellulose film having $n_y > n_z$, $R_\theta$ values of all cyclic olefin films increased, which indicates that $R_{th}$ of a cyclic olefin film is produced due to a negative birefringence $(n_y > n_z)$ in a direction through the film thickness.

Example 5

Surface Treatment and Lamination with Polyvinyl Alcohol (PVA) Polarization Film

The surface tension of the NB-MA copolymer film obtained from Example 1 was determined by measuring the contact angle and using Equations 3 and 4 (Wu, S. J. Polym. Sci. C Vol 34, P19, 1971):

$$\gamma_S = \gamma_{SL} + \gamma_{LV} \cos\theta \tag{3}$$

$$\gamma_{SL} = \gamma_S + \gamma_{LV} - 4\left(\frac{\gamma_{LV}^d \gamma_S^d}{\gamma_{LV}^d + \gamma_S^d} + \frac{\gamma_{LV}^p \gamma_S^p}{\gamma_{LV}^p + \gamma_S^p}\right) \tag{4}$$

where $\gamma_s$ is a surface tension of the film, $\gamma_{LV}$ is a surface tension of liquid, $\gamma_{SL}$ is a interfacial tension between the film and liquid, $\cos\theta$ is a contact angle, $\gamma^d$ is a dispersion term of the surface tension, and $\gamma^p$ is a polar term of the surface tension.

When water was used, the contact angle was 74.3° and when methane was used, the contact angle was 33.5°. A surface tension calculated from these values was 49.5 mN/m.

The NB-MA copolymer film was subjected three times to a corona treatment at a current of 8 mA and a line speed of 6 m/min, and then the contact angle was measured. When water was used, the contact angle was 20.7° and when diode methane was used, the contact angle was 22°. A surface tension calculated from these values was 76.9 mN/m.

Within 30 minutes after the corona treatment, the film was roll laminated on a fully dried PVA polarization film in a 10% by weight PVA aqueous solution and dried at 80° C. for 10 minutes. Then, the PVA polarization plate on which the NB-MA copolymer film was laminated exhibited excellent adhesion.

Example 6

Preparation of Plastic Lens

Each of the polymers prepared in Preparation Examples 1-4 was palletized with an extruder under nitrogen atmosphere. The obtained pellets were injection compression molded with a mold for a spectacle concave lens at a cylinder temperature of 200 to 300° C., at a mold temperature of 110° C. to obtain a lens. The obtained lens was tested under condition of 70° C., 95% RH relative humidity for 24 hrs to show a good appearance and more than 90% light transmittance in the range of 400~700 nm.

According to the copolymerization method, a cyclic olefin and a polar vinyl olefin can be effectively copolymerized using a catalyst system composed of a compound containing a group 13 element and a radical initiator. The resulting copolymer is transparent, has sufficient adhesion to metals or other polymers, thermal stability and strength, and exhibits a low dielectric constant sufficient to be used as insulating electronic materials. Thus, the optical film including the copolymer can be used as a polarizer protective film, an adhesive film, an anisotropic film, and a compensation film, and in a LCD display.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of copolymerizing cyclic olefins and polar vinyl olefins, comprising:
  contacting a cyclic olefin monomer and a polar vinyl olefin monomer with a catalyst system comprising:
  i) a compound represented by formula (1) containing a group 13 element; and
  ii) a radical initiator composed of an azo compound represented by formula (2) or a peroxide compound represented by formula (3):

$$M(R^0)_{n1}(OR^1)_{n2}(X)_{n3} \qquad (1)$$

where M is a group 13 element;
O is an oxygen atom;
each of n1, n2, and n3 is independently an integer of 0-3 and n1+n2+n3=3;
each of $R^0$ and $R^1$ is independently a hydrogen atom; a linear or branched $C_{1-20}$ alkyl, alkenyl, or vinyl; a $C_{5-12}$ cycloalkyl optionally substituted by a hydrocarbon; a $C_{6-40}$ aryl optionally substituted by a hydrocarbon; or a linear or branched $C_{1-20}$ alkyl or aryl containing 1-10 hetero atoms selected from a group consisting of N, O, and halogen atoms; and
X is a halogen atom;

$$A_1-N=N-A_2 \qquad (2)$$

where N is a nitrogen atom; and
each of $A_1$ and $A_2$ is independently a hydrogen atom; a linear or branched $C_{1-20}$ alkyl, alkoxy, alkenyl, or vinyl; a $C_{5-12}$ cycloalkyl optionally substituted by a hydrocarbon; a $C_{6-40}$ aryl optionally substituted by a hydrocarbon; or a linear or branched $C_{1-20}$ alkyl, alkoxy, alkenyl, aryl, or cycloalkylhetero containing a cyano group, a carbonyl group, a carboxylic group, an ether group, or an amide group;

$$B_1-O-O-B_2 \qquad (3)$$

where O is an oxygen atom; and
each of $B_1$ and $B_2$ is independently a hydrogen atom; a linear or branched $C_{1-20}$ alkyl, alkoxy, alkenyl, or vinyl; a $C_{5-12}$ cycloalkyl optionally substituted by a hydrocarbon; a $C_{6-40}$ aryl optionally substituted by a hydrocarbon; or a linear or branched $C_{1-20}$ alkyl, alkoxy, alkenyl, aryl, or cycloalkylhetero containing a cyano group, a carbonyl group, a carboxylic group, an ether group, or an amide group,
wherein the cyclic olefin monomer is represented by formula (4):

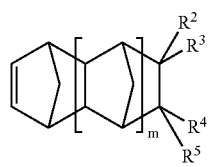

(4)

where m is an integer of 0-4: $R^2$, $R^3$, $R^4$, and $R^5$ may be a nonpolar functional group selected from a hydrogen atom, a halogen atom, a linear or branched $C_{1-20}$ alkyl, alkenyl, or vinyl, a $C_{5-12}$ cycloalkyl optionally substituted by a hydrocarbon, a $C_{6-40}$ aryl optionally substituted by a hydrocarbon, a $C_{7-15}$ aralkyl optionally substituted by a hydrocarbon, or a $C_{3-20}$ alkynyl; or a polar functional group selected from the group consisting of $-(CH_2)_nC(O)OR^6$, $-(CH_2)_nOC(O)R^6$, $-(CH_2)_nOC(O)OR^6$, $-(CH_2)_nC(O)R^6$, $-(CH_2)_nOR^6$, $-(CH_2)_n-OR^6$, $-(CH_2)_nC(O)-O-C(O)R^6$, $-(CH_2)_nC(O)NH_2$, $-(CH_2)_nC(O)NHR^6$, $-(CH_2)_nC(O)N(R^6)_2$, $-(CH_2)_nNH_2$, $-(CH_2)_nNHR^6$, $-(CH_2)_nN(R^6)_2$, $-(CH_2)_nOC(O)NH_2$, $-(CH_2)_nOC(O)NHR^6$, $-(CH_2)_nOC(O)N(R^6)_2$, $-(CH_2)_nC(O)Cl$, $-(CH_2)_nSR^6$, $-(CH_2)_nSSR^6$, $-(CH_2)_nSO_2R^6$, $-(CH_2)_nSO_2R^6$, $-(CH_2)_nOSO_2R^6$, $-(CH_2)_nSO_3R^6$, $-(CH_2)_nOSO_3R^6$, $-(CH_2)_nB(R^6)_2$, $-(CH_2)_nB(OR^6)_2$, $-(CH_2)_nB(R^6)(OR^6)$, $-(CH_2)_nN=C=S$, $-(CH_2)_nNCO$, $-(CH_2)_nN(R^6)C(=O)R^6$, $-(CH_2)_nN(R^6)C(=O)(OR^6)$, $-(CH_2)_nCN$, $-(CH_2)_nNO_2$, $-(CH_2)_nP(R^6)_2$, $-(CH_2)_nP(OR^6)_2$, $-(CH_2)_nP(R^6)(OR^6)$, $-(CH_2)_nP(=O)(R^6)_2$, $-(CH_2)_nP(=O)(OR^6)_2$, and $-(CH_2)_nP(=O)(R^6)(OR^6)$;

$R^6$ is a hydrogen atom, a linear or branched $C_{1-20}$ alkyl, alkenyl, or vinyl, a $C_{5-12}$ cycloalkyl optionally substituted by a hydrocarbon, a $C_{6-40}$ aryl optionally substituted by a hydrocarbon, a $C_{7-15}$ aralkyl optionally substituted by a hydrocarbon, or a $C_{3-20}$ alkynyl; and, n is an integer of 0-10: when $R^2$, $R^3$, $R^4$, and $R^5$ are a polar functional group, a hydrogen atom, or a halogen atom, $R^2$ and $R^3$, or $R^4$ and $R^5$ can be connected to each other to form a $C_{1-10}$ alkylidene group, or $R^2$ or $R^3$ can be connected to one of $R^4$ and $R^5$ to form a saturated or unsaturated $C_{4-12}$ cyclic group or an $C_{6-17}$ aromatic ring compound.

2. The method of claim 1, wherein the polar vinyl olefin monomer is represented by formula (5):

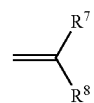

(5)

where
at least one of $R^7$ and $R^8$ is a polar functional group selected from the group consisting of $-(CH_2)_nC(O)OR^9$, $-(CH_2)_nOC(O)R^9$, $-(CH_2)_nOC(O)OR^9$, $-(CH_2)_nC(O)R^9$, $-(CH_2)_nOR^9$, $-(CH_2O)_n-OR^9$, $-(CH_2)_nC(O)-O-C(O)R^9$, $-(CH_2)_nC(O)NH_2$, $-(CH_2)_nC(O)NHR^9$, $-(CH_2)_nC(O)N(R^9)_2$, $-(CH_2)_nNH_2$, $-(CH_2)_nNHR^9$, $-(CH_2)_nN(R^9)_2$, $-(CH_2)_nOC(O)NH_2$, $-(CH_2)_nOC(O)NHR^9$, $-(CH_2)_nOC(O)N(R^9)_2$, $-(CH_2)_nC(O)Cl$, $-(CH_2)_nSR^9$, $-(CH_2)_nSSR^9$, $-(CH_2)_nSO_2R^9$, $-(CH_2)_nSO_2R^9$, $-(CH_2)_nOSO_2R^9$, $-(CH_2)_nSO_3R^9$, $-(CH_2)_nOSO_3R^9$, $-(CH_2)_nB(R^9)_2$, $-(CH_2)_nB(OR^9)_2$, $-(CH_2)_nB(R^9)(OR^9)$, $-(CH_2)_nN=C=S$, $-(CH_2)_nNCO$, $-(CH_2)_nN(R^9)C(=O)R^9$, $-(CH_2)_nN(R^9)C(=O)(OR^9)$, $-(CH_2)_nCN$, $-(CH_2)_nNO_2$, $-(CH_2)_nP(R^9)_2$, $-(CH_2)_nP(OR^9)_2$, $-(CH_2)_nP(R^9)(OR^9)$, $-(CH_2)_nP(=O)(R^9)_2$, $-(CH_2)_nP(=O)(OR^9)_2$, and $-(CH_2)_nP(=O)(R^9)(OR^9)$;
the remaining substituent is a hydrogen atom; a halogen atom; a linear or branched $C_{1-20}$ alkyl, alkenyl, or vinyl; a $C_{5-12}$ cycloalkyl optionally substituted by a hydrocarbon; a aryl optionally substituted by a hydrocarbon; a $C_{7-15}$ aralkyl optionally substituted by a hydrocarbon; or a $C_{3-20}$ alkynyl;
n is an integer of 0-10; and $R^9$ is a hydrogen atom, a linear or branched $C_{1-20}$ alkyl, alkenyl, or vinyl, a $C_{5-12}$ cycloalkyl optionally substituted by a hydrocarbon, a $C_{6-40}$ aryl optionally substituted by a hydrocarbon, a $C_{7-15}$ aralkyl optionally substituted by a hydrocarbon, or a $C_{3-20}$ alkynyl.

3. The method of claim 1, wherein the cyclic olefin monomer is a non-polar cyclic olefin monomer or a mixture of a polar cyclic olefin monomer and a non-polar cyclic olefin monomer.

4. The method of claim 1, wherein a polymerization temperature is in the range of 20-150° C.

5. The method of claims 1, wherein the cyclic olefin monomer and the polar vinyl olefin monomer comprise a combination of two cyclic olefin monomers having different functional groups and a polar olefin monomer, or a combination of two polar vinyl olefin monomers having different functional groups and a cyclic olefin monomer.

6. The method of claim 1, wherein the copolymer further comprises a non-polar vinyl olefin monomer represented by formula (6) in addition to the cyclic olefin monomer and the polar vinyl monomer:

 (6)

where
each of $R^{10}$ and $R^{11}$ is independently a hydrogen atom; a halogen atom; a linear or branched $C_{1-20}$ alkyl, alkenyl, or vinyl; a $C_{5-12}$ cycloalkyl optionally substituted by a hydrocarbon; a $C_{6-40}$ aryl optionally substituted by a hydrocarbon; a $C_{7-15}$ aralkyl optionally substituted by a hydrocarbon; or a $C_{3-20}$ alkynyl.

7. The method of claim 1, wherein the group 13 compound is the organoaluminium compound represented by formula (7), and the radical initiator is the azo compound represented by formula (2):

$$Al(R^0)_{n1}(OR^1)_{n2}(X)_{n3} \qquad (7)$$

where Al is an aluminium atom; O is an oxygen atom; each of n1, n2, and n3 is independently an integer of 0-3 and n1+n2+n3=3; each of $R^0$ and $R^1$ is independently a hydrogen atom; a linear or branched $C_{1-20}$ alkyl, alkenyl, or vinyl; a $C_{5-12}$ cycloalkyl optionally substituted by a hydrocarbon; a $C_{6-40}$ aryl optionally substituted by a hydrocarbon; or a linear or branched $C_{1-20}$ alkyl or aryl containing 1-10 hetero atoms selected from a group consisting of N, O, and halogen atoms; and X is a halogen atom;

$$A_1-N=N-A_2 \qquad (2)$$

where N is a nitrogen atom; and each of $A_1$ and $A_2$ is independently a hydrogen atom; a linear or branched $C_{1-20}$ alkyl, alkoxy, alkenyl, or vinyl; a $C_{5-12}$ cycloalkyl optionally substituted by a hydrocarbon; a $C_{6-40}$ aryl optionally substituted by a hydrocarbon; or a linear or branched $C_{1-20}$ alkyl, alkoxy, alkenyl, aryl, or cycloalkylhetero containing a cyano group, a carbonyl group, a carboxylic group, an ether group, or an amide group.

* * * * *